J. WILLIAMS, Jr.
FEED DEVICE FOR LIQUIDS.
APPLICATION FILED MAY 31, 1912.
1,084,380.
Patented Jan. 13, 1914.
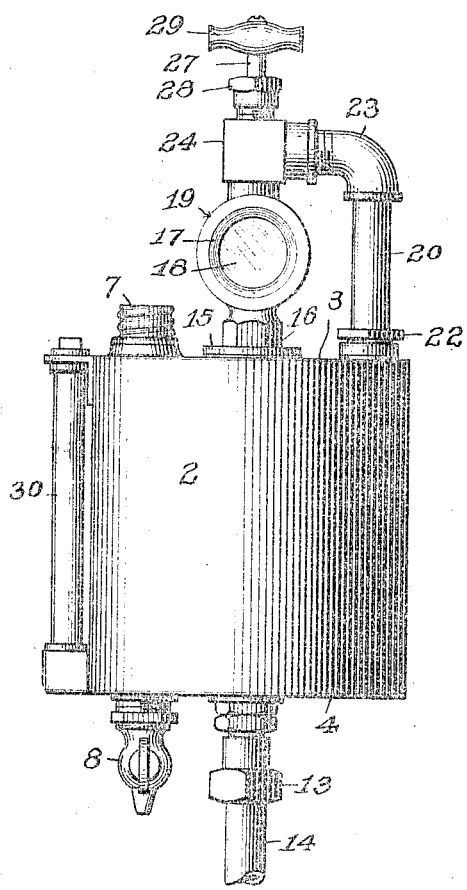
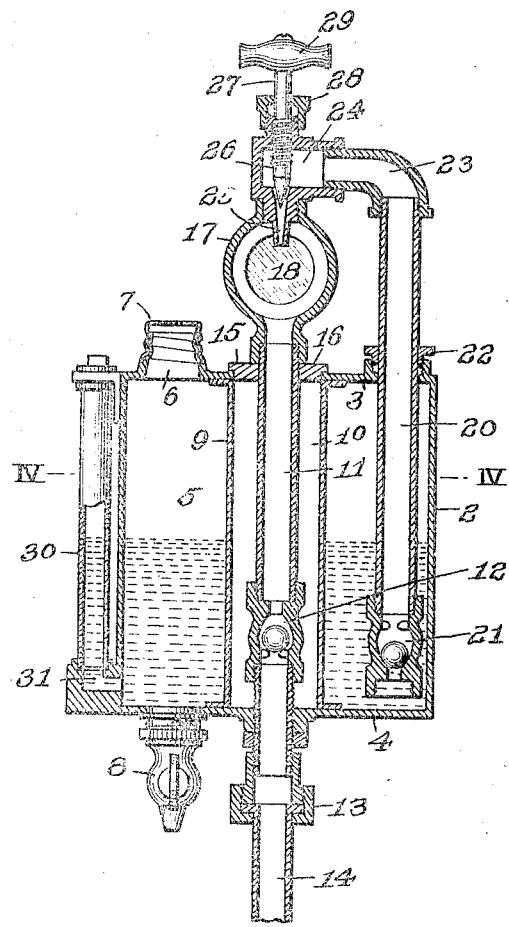
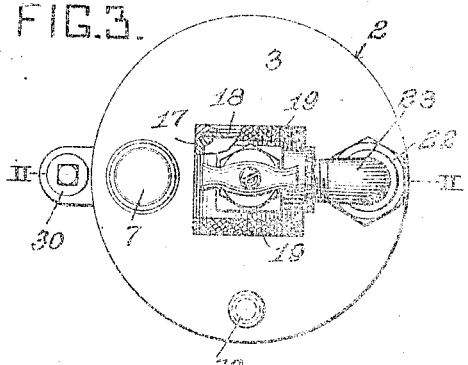
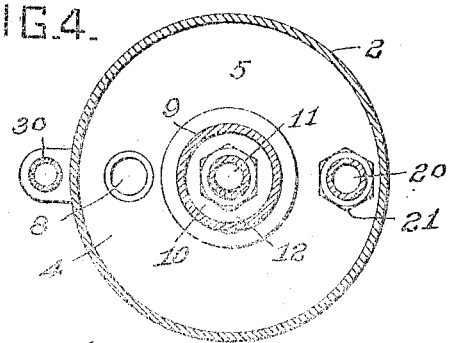

UNITED STATES PATENT OFFICE.

JOSEPH WILLIAMS, JR., OF PITTSBURGH, PENNSYLVANIA, ASSIGNOR OF ONE-THIRD TO MELLVILLE C. THOMPSON AND ONE-THIRD TO DAVID S. IRVIN, BOTH OF PITTSBURGH, PENNSYLVANIA.

FEED DEVICE FOR LIQUIDS.

1,084,380.     Specification of Letters Patent.     Patented Jan. 13, 1914.

Application filed May 31, 1912.  Serial No. 700,794.

*To all whom it may concern:*

Be it known that I, JOSEPH WILLIAMS, Jr., a citizen of the United States, residing at Pittsburgh, in the county of Allegheny and State of Pennsylvania, have invented certain new and useful Improvements in Feed Devices for Liquids, of which the following is a specification.

My invention has for its object to provide means for supplying a measured quantity of liquid to a boiler or other utilizing apparatus, in connection with a forced feed mechanism, as an injector.

It comprises a reservoir for the liquid provided with circulating conduit pipes adapted for connection with an injector or the like for inducing a forced feed by suction, a controlling device for regulating the rate of flow, an observation aperture, one or more check valves, supply and exhaust openings and other features of construction as shall be more fully hereinafter described.

The device is particularly designed for the purpose of supplying a boiler compound in limited and regulable quantities whereby the compound may be charged, with the supply water, into the boiler.

The drawings illustrate one preferred form of construction in which —

Figure 1 is a view of the device in side elevation. Fig. 2 is a vertical sectional view on the line II II of Fig. 3. Fig. 3 is a plan view. Fig. 4 is a cross section on the line IV IV of Fig. 2.

The reservoir 2 for the liquid compound is made of sheet or cast metal, preferably in cylindrical form, having a top 3 and bottom 4. The interor fluid-containing cavity 5 is filled with the liquid through a charging opening 6 having a removable cap 7, and may be drained by a cock or valve 8.

Extending vertically from the top to the bottom of the reservoir and centrally arranged thereof is a tubular partition 9 providing an interior clearance opening 10 for passage of the delivery pipe 11. Said pipe is preferably provided with a check valve 12 intermediate of its length, and extends downwardly through the bottom and is connected by a union or coupling 13 with the supply pipe 14, the other end, broken away, being connected with the force feed device, as an injector or siphon or the like. The upper end of pipe 11 projects through the cover 3, or a cap 15 thereon, and is connected with the lower end 16 of a circular observation chamber 17. Said chamber is provided at each side with glass disks 18, by which the interior cavity and rate of flow or drop may be observed, said glass disks being secured to each opposite face of the observation chamber by rings 19.

A supply pipe 20 extends downwardly to within a short distance of the bottom 4 of the reservoir 2, preferably having a terminal check valve 21 at its lower end, which, like check valve 12, seats against back pressure so as to prevent reverse flow or pressure to the interior of the reservoir from the injector, due to any cause, such as diverted steam pressure. This check valve is useful in maintaining a column of liquid above the valve. Pipe 20 extends upwardly through a suitable stuffing box 22 and communicates with the interior of observation chamber 17 and supply pipe 11, through an elbow coupling 23 and a valve casing 24 having a downwardly extending terminal dropper 25. A needle valve 26 is adjustably mounted with relation to the tapered interior of terminal 25 by a threaded stem 27, mounted in the valve casing 24, having a suitable stuffing box 28 and finger terminal 29. By this construction the rate of induced flow of the liquid compound, actuated by suction, may be readily and accurately controlled.

For the purpose of indicating the level of the liquid compound within the reservoir, an observation or sight glass tube 30 is mounted at one side of the reservoir having communication with the lower portion thereof through a suitable fitting and communication 31.

If desired, pressure may be applied to the contained liquid by connecting a steam, water, compressed air, or other fluid pipe with a coupling 32 at any suitable location, as on the top of the reservoir, said coupling being otherwise normally closed by a seating cap.

The construction and operation of the device will be readily understood from the foregoing description. It enables the operator to accurately control and observe the operation of the feed at all times so as to avoid waste or insufficient supply. It operates to feed during maintenance of suction and to automatically cease operation upon cessation of suction.

The device is comparatively simple in construction, reliable and efficient in operation, not liable to get out of order, and effects a material economy in the use of the compound, while providing for accurate regulation to suit local conditions as to the character of the water being supplied to the boiler, etc.

It may be made in various sizes, proportions or designs to suit the conditions or requirements of use, and the invention may be changed or varied by the skilled mechanic without departure from the scope of the following claims.

What I claim is:

1. In a feed device for liquid, the combination of a reservoir having an interior transverse shell forming the inner wall of the reservoir and providing a central clearance opening, a feed pipe adapted for connection with a suction creating device extending upwardly through said shell beyond the reservoir and provided within said shell with an upwardly seating check valve, a chambered sight feed casing connected with the upper end of said pipe, a circulation controlling valve connected with said casing, and a pipe connected with the other side of said valve and extending downwardly within to the bottom portion of the reservoir and provided with a terminal gravity seating check valve, substantially as set forth.

2. In a feed device for liquid, the combination of a reservoir having an interior transverse shell providing a clearance opening, a feed pipe adapted for connection with a suction-creating device extending upwardly through said shell beyond the reservoir, a chambered sight feed casing connected with the upper end of said pipe, a circulation controlling valve connected with said casing, and a pipe connected with the other side of said valve and extending downwardly within to the bottom portion of the reservoir and provided with a check valve, substantially as set forth.

In testimony whereof I hereunto affix my signature in the presence of two witnesses.

JOSEPH WILLIAMS, Jr.

Witnesses:
C. M. CLARKE,
FRED'K STAUB.